United States Patent [19]

Hollenbeck et al.

[11] 4,409,532

[45] Oct. 11, 1983

[54] START CONTROL ARRANGEMENT FOR SPLIT PHASE INDUCTION MOTOR

[75] Inventors: Robert K. Hollenbeck; Jimmy R. Rickard, both of Louisville, Ky.

[73] Assignee: General Electric Company, Louisville, Ky.

[21] Appl. No.: 318,717

[22] Filed: Nov. 6, 1981

[51] Int. Cl.³ ............................ H02P 3/20; H02P 1/24
[52] U.S. Cl. ....................................... 318/749; 318/786
[58] Field of Search ....................... 318/749, 751–756, 318/786, 237, 798, 781

[56] References Cited

U.S. PATENT DOCUMENTS

| | | | |
|---|---|---|---|
| 3,152,462 | 10/1964 | Elliott et al. | 68/12 |
| 3,528,103 | 9/1970 | Wolf | 318/754 |
| 3,529,224 | 9/1970 | Bedford | 318/237 |
| 3,688,170 | 8/1972 | Karklys et al. | 318/749 |
| 3,697,841 | 10/1972 | Nystuen | 318/749 |
| 3,761,792 | 9/1973 | Whitney et al. | 318/788 |
| 4,052,648 | 10/1977 | Nola | 318/200 |
| 4,194,145 | 3/1980 | Ritter | 318/799 |
| 4,271,386 | 6/1981 | Lee | 318/729 |
| 4,361,792 | 11/1982 | Davis, Jr. et al. | 318/729 |

OTHER PUBLICATIONS

Turner et al., "Microprocessor–Based Universal Motor Protection System", IEEE Trans. on Industry Applications, vol. IA–17, No. 1, Jan./Feb. 1981, pp. 58–62.
General Technical Discussion of Power Factor Controller from Publication of Unknown Source Which Includes as Part Thereof a Copy of '648 Patent to Nola.

*Primary Examiner*—David Smith, Jr.
*Attorney, Agent, or Firm*—H. Neil Houser; Radford M. Reams

[57] ABSTRACT

A control arrangement for a reversible alternating current split phase induction motor of the type having a start winding electrically connected in parallel with a run winding, which controls the duty cycle of current in the start winding to selectively initiate rotation of the motor in the desired direction.

In one form of the invention, a thyristor switching device is connected in series with the start winding to phase control the start winding current. An electronic controller triggers the thyristor into conduction at a first firing angle to initiate motor rotation in one direction and at a second firing angle to initiate motor rotation in the other direction. The first firing angle is less than 45° and preferably in the range of 25°–45° relative to the supply voltage signal and the second firing angle is preferably in the range of 90°–135° relative to the supply voltage signal.

In another form of the invention, the control arrangement additionally includes a monitoring circuit which monitors the phase angle between line voltage and run winding current. The controller is responsive to the monitoring circuit to inhibit thyristor trigger signals to the start winding thyristor when a predetermined relationship exists between the phase angle and a reference value, thereby effectively switching the start winding out of the circuit when the motor gets up to speed.

18 Claims, 7 Drawing Figures

START CONTROL ARRANGEMENT FOR SPLIT PHASE INDUCTION MOTOR

BACKGROUND OF THE INVENTION

This invention relates to start control arrangements for reversible alternating current split phase induction motors. More specifically, this invention relates to start control arrangements for selectively initiating rotation of the motor in one direction or the other.

Reversible motors of the split phase induction type are frequently used to drive domestic major appliances such as clothes washers, for example. Typically, the motor is selectively energized for rotation in one direction for wash and the other direction for spin.

Such motors include a start winding and a run winding connected in parallel and energized by a single phase power supply. The start winding is used to provide a rotating stator field to initiate rotation of the rotor. Once the motor gets up to or substantially up to speed, the start winding is deenergized to reduce power loss in the winding. In arrangements known in the art, the polarity of the start winding determines the direction of rotation of the motor. The direction of rotation can thus be reversed by reversing the polarity of the start winding relative to the run winding prior to energizing the winding. Typically, mechanical, electromechanical or electronic switch means are employed in series with the start winding to effectively reverse the connection linking the run winding to the power supply. This approach works satisfactorily; however, the polarity reversing means employed, such as electromechanical relay means or electronic switch means, add significant cost to the control system. Switch means, known in the art for deenergizing the start winding once the motor gets up to speed, include centrifugal switch means responsive to rotating motor speed, and operative to switch the winding out of the circuit when the motor attains a predetermined speed, and current actuated switch means responsive to the magnitude of the run current operative to open the start winding circuit when the run current drops below a predetermined threshold level. This approach also works satisfactorily; however, as in the case of conventional polarity reversal arrangements the conventional switch means employed for deenergizing the start winding adds cost to the control system.

A control arrangement for a reversible split phase induction motor which selectively initiates rotation of the motor in the desired direction without need for a relatively costly mechanical switch means for changing the polarity of the start winding and deenergizing the start winding when the motor gets up to speed is highly desirable.

It is therefore an object of the present invention to provide a control arrangement for a reversible split phase induction motor which selectively initiates rotation of the motor in the desired direction by phase controlling the start winding thereby eliminating the need for polarity reversing switch means.

It is a further object of the present invention to provide a control arrangement of the aforementioned type which monitors motor speed and inhibits triggering of the phase control means thereby deenergizing the motor start winding once the motor speed exceeds a predetermined threshold.

SUMMARY OF THE INVENTION

A control arrangement for a reversible alternating current split phase induction motor of the type having a start winding electrically connected in parallel with a run winding is provided which controls the duty cycle of current in the start winding to selectively initiate rotation of the motor in the desired direction. The control arrangement comprises current control means electrically connected in series with the start winding and operative to selectively vary the portion of each half-cycle of the start winding voltage signal during which current flows in the start winding between a first predetermined portion on the order of 80-100% of the half-cycle to initiate rotation in one direction and a second predetermined portion on the order of 30-55% of the half-cycle to initiate rotation in the other direction.

In a preferred form of the invention, phase control of the start winding current is implemented using a thyristor device in series with the start winding as the current control means. Electronic control means triggers the thyristor into conduction at a first firing angle to initiate motor rotation in one direction and at a second firing angle to initiate motor rotation in the other direction. The first firing angle is less than 45° and preferably in the range of 25°-45° relative to the supply voltage signal and the second firing angle is preferably in the range of 90°-135° relative to the supply voltage signal.

In another form of the invention, the control arrangement includes means for monitoring the phase angle between line voltage and run winding current and the control means includes means responsive to the monitoring means operative to inhibit thyristor trigger signals to the start winding thyristor when a predetermined relationship exists between the phase angle and a reference value, thereby effectively switching the start winding out of the circuit when the motor gets up to speed.

DETAILED DESCRIPTION

While the novel features of the invention are pointed out with particularity in the appended claims, the invention both as to organization and contents will be more completely understood and appreciated from the following detailed description taken in conjunction with the drawings.

Figure 1:
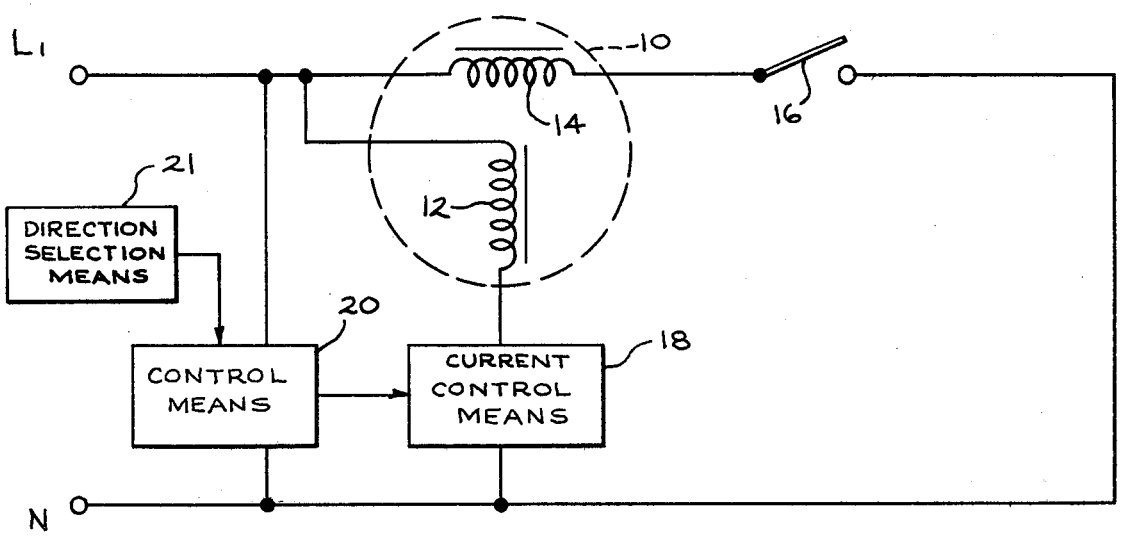
FIG. 1 is a block diagram schematically representing a control circuit illustratively embodying one form of the present invention.

Referring now to the drawings wherein identical reference numerals denote similar or corresponding elements throughout the various views, FIG. 1 is a highly simplified schematic diagram representation of a control arrangement for an alternating current split phase induction motor of the type typically employed in domestic home appliances such as clothes washers, dryers and dishwashers. Motor 10, including a start winding 12 and a run winding 14 electrically connected in parallel with start winding 12, is adapted for energization by a voltage signal from an external alternating current power supply such as the standard 120 volt, 60 Hz household power supply. The voltage signal is applied to input terminals $L_1$ and N. Current through run winding 14 is controlled by switch means 16 which could be of various types including a simple mechanical switching device electrically connected in series with the run winding. While shown on the N terminal side of the run winding, it will be apparent to those skilled in the art that for many applications switch means 16 could as well be connected on the L terminal side so as to function as an ON/OFF switch for the entire motor circuit.

Motor direction control is provided in accordance with the present invention by controlling the portion of each half-cycle of the voltage signal during which current flows through start winding 12. Current through start winding 12 is controlled by current control means 18 which is operative to selectively vary the current conducting portion of each half-cycle of the start winding voltages signal between a portion in the range of 80-100% to initiate rotation of the motor in one direction and a duty cycle in the range of 25-50% to initiate rotation of the motor in the opposite direction.

In a preferred form of the invention, such control is achieved by phase controlling the start winding current. In this form, current control means 18 comprises phase control means preferably in the form of a thyristor device. As used herein, the term thyristor is intended to cover gate-controlled semiconductor switches which are characterized by their ability to turn ON, that is, switch into conduction when a current signal is applied to their gate terminal and to turn OFF or commutate OFF, that is, to switch into a non-conductive mode when the current through the thyristor drops below a predetermined minimum holding current level. One well known thyristor device frequently used in phase control application which may be particularly advantageously employed in the control arrangement of the present invention is the triac. The triac is a gate-controlled bidirectionally conducting device in which conduction of current through the device when either load terminal is positive relative to the other can be initiated by the application of a gating signal to the gate terminal of the device. Thereafter, the gating terminal loses control over conduction through the device until the current through the device drops below a minimum holding current level by reduction of the applied voltage to zero, and the device turns OFF.

In the circuit of FIG. 1, phase control of the start winding current is implemented by control means 20 which renders the current control means 18 conductive by the application of a trigger signal at one predetermined phase angle or firing angle during each half-cycle of the start winding voltage signal to initiate rotation in one direction and at a second predetermined phase angle or firing angle to initiate rotation of the motor in the other direction. Once triggered into conduction the current control means remains conductive until the end of that current half-cycle when the current commutates OFF. Direction selection means 21 determines which firing angle is to be implemented by control means 20. Selection means 21 may be a simple two-state switch adapted for user actuation. The state of the switch indicates to control means 20 which direction of rotation is to be implemented. In the illustrative embodiments to be described hereinafter, the selection means is part of a preprogrammed appliance controller which calls for one direction of rotation for certain operating cycles and the other direction for other operating cycles.

In the illustrative embodiments described herein, the phase angle or firing angle is defined relative to the applied voltage signal, that is the current or phase control means is triggered a predetermined time after each zero crossing of the voltage signal. However, the firing angle could also be determined relative to the current signal itself using sensing means to determine zero crossings of the current signal and timing from each such occurrence.

Figure 2:
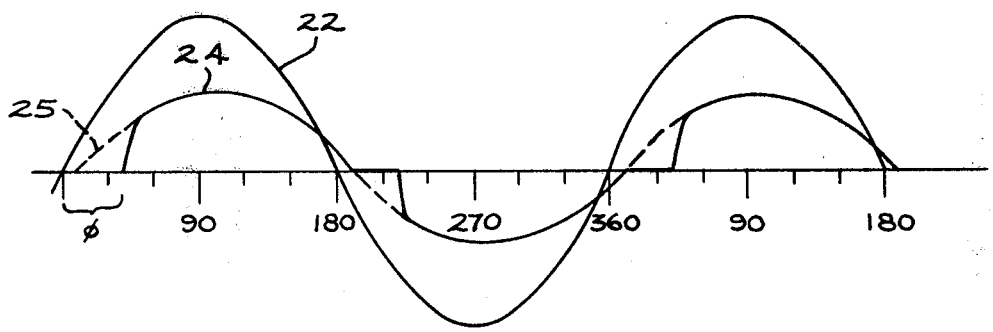
FIG. 2 is a graphical representation of the line voltage and start winding current representing one mode of circuit operation for the circuit of FIG. 1.
Figure 3:
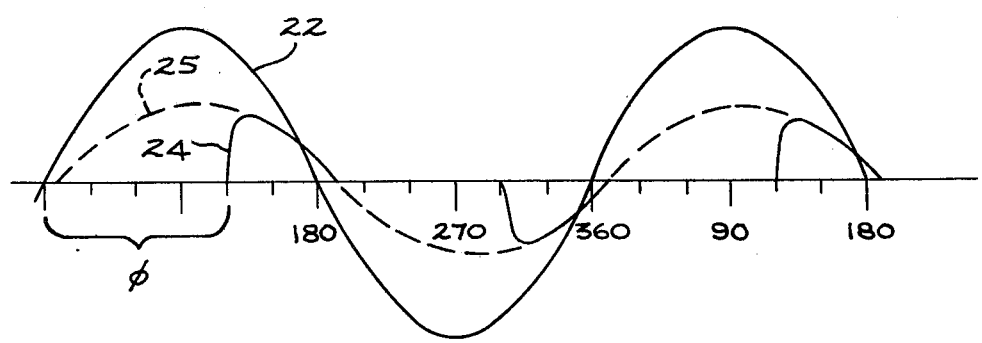
FIG. 3 is a graphical representation of the line voltage and start winding current representing another mode of circuit operation for the circuit of FIG. 1.

The current and voltage waveforms of FIGS. 2 and 3 illustrate phase control of the start winding current for two different values of the firing angle. In these figures, waveform 22 represents the supply voltage signal and waveform 24 represents the start winding current signal. The phantom lines 25 illustrate what the start current waveform would be absent phase control or phase control with a firing angle immediately after current commutation. It is to be understood that the voltage and current magnitudes shown are not to scale, the purpose of the illustrations being to illustrate the time relationship of the voltage and current signals. The firing angle shown in FIG. 2 represents a firing angle of approximately 40° used in the illustrative embodiment to initiate motor rotation in one direction; FIG. 3 represents the firing angle of approximately 120° used in the illustrative embodiment to initiate motor rotation in the other direction.

Figure 4:
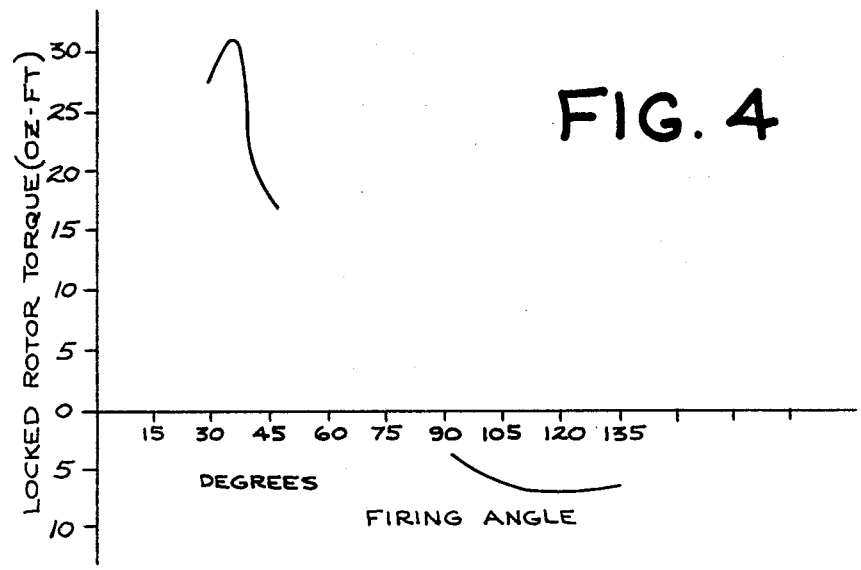
FIG. 4 is a graphical representation of the relationship between locked rotor torque and start winding phase angle for the motor of the illustrative embodiment of FIG. 1.

The use of phase control to selectively initiate rotation of a split phase induction motor in accordance with the present invention is effective because of the locked rotor torque versus start current firing angle characteristic of such motors. Though the theory of operation is not presently fully understood, we have empirically determined that the locked rotor torque of a conventional ⅓ horsepower split phase induction appliance motor of the type readily commercially available from General Electric Company by the model number 5KH42DT62S, varies generally with the firing angle as shown in FIG. 4. As shown, the torque is relatively high, greater than 20 oz-ft. for firing angles less than 45° with a peak at about 30°-35°, falling off rapidly after 45°, and becoming negative representing torque in the opposite direction for firing angles in the 90°-135° range. Thus, for firing angles less than 45°, the locked rotor torque acts in one direction, and exceeds 20 oz-ft. with a peak value of roughly 30 oz-ft. at a firing angle of about 35°. Locked rotor torque opposite in direction and of substantially lower torque on the order of 8-10 oz-ft. is obtained for firing angles in the 90°-135° range.

As mentioned hereinbefore, these results were achieved using a conventional split phase induction appliance motor. It is possible that a split phase motor may be designed to provide more optimum performance in the negative torque direction when phase controlling the start winding current in accordance with this invention to control motor direction.

Notwithstanding the reduced locked rotor torque in one direction, the control arrangement of applicant's invention as disclosed herein may be advantageously employed in an environment in which the load presented when initiating rotation in one direction is substantially less than the load presented when initiating rotation in the opposite direction. For example, in a domestic clothes washer, the starting torque requirement for a motor to rotate in the wash direction is substantially higher than that required for spin because of the clutch drive arrangement which reduces significantly the starting torque load in the spin direction. The use of phase control as described herein has been found to provide sufficient torque to satisfy the requirements for wash and spin in a typical domestic clothes washer.

Figure 5:
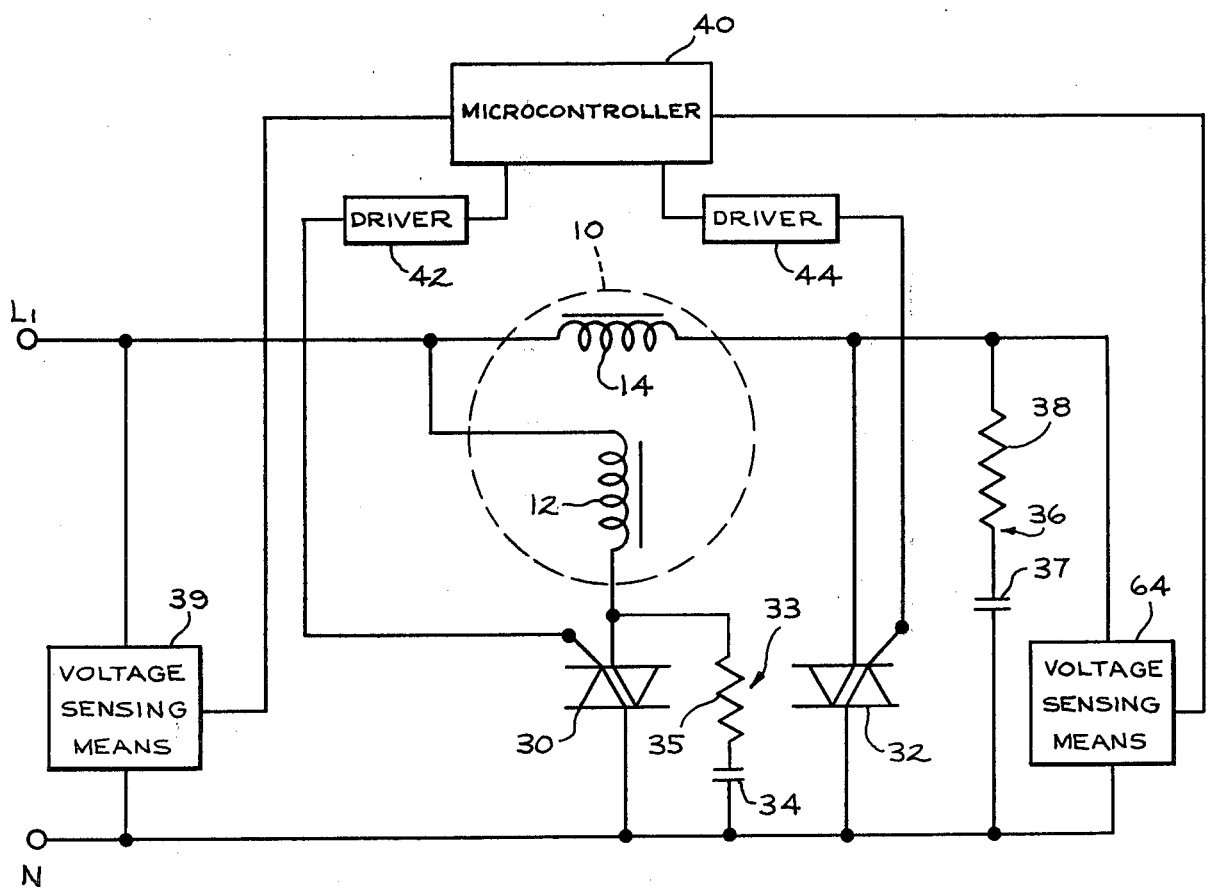
FIG. 5 is a schematic circuit diagram illustratively embodying the control arrangement of FIG. 1.

Referring now to the circuit diagram of FIG. 5, there is shown a control arrangement for driving an appliance motor such as might be used in a clothes washing appliance. Energization of the split phase induction appliance motor 10 is controlled by thyristor means in the form of triacs 30 and 32 serially connected with the start and run windings 12 and 14, respectively. These triacs may be conventional in design and operation such as those marketed by General Electric Company as type SC151D. Snubber circuit designated generally 33 comprising a capacitor 34 and a resistor 35, and snubber circuit designated generally 36 comprising capacitor 37 and resistor 38, are electrically connected in parallel with triacs 30 and 32, respectively, in a conventional manner to absorb transient voltages resulting from the commutation of winding current by the triacs.

Voltage sensing means 39 is provided in the form of a zero crossing detector circuit which generates a square wave, changing polarity in concert with zero crossings of the voltage signal applied to terminals $L_1$ and N. Control means is provided in the form of a microcontroller 40 and triac driver circuits 42 and 44. Microcontroller 40 is a readily commercially available single chip MOS microcontroller designated COP 420L manufactured by National Semiconductor Corporation. This device is described in detail in National Semiconductor publication entitled, "COP 420L/421L and COP 320L/321L Single Chip MOS Microcontrollers," copyrighted 1979, which is hereby incorporated by reference. Driver circuits 42 and 44 may be any of several conventional driver circuit arrangements operative to couple the triac trigger signals generated by microcontroller 40 to the gate terminals of triacs 30 and 32, respectively.

The microcontroller is programmed to trigger run current control triac 32 into conduction at a first firing angle which is selected so as to trigger triac 32 into conduction early in the line voltage signal half-cycle delaying only long enough to allow sufficient time to insure that the triac has commutated off from the previous half-cycle thereby rendering triac 32 conductive for the major portion of each half-cycle of the line voltage signal. Specifically, the controller is programmed to trigger triac 32 into conduction when a predetermined time has elapsed following the occurrence of a zero crossing pulse generated by voltage sensing means 39. In the illustrative embodiment, the firing angle for the run winding triac is chosen to be 35 degrees. It is to be understood that other means for triggering triac 32 into conduction may be employed provided only that the triac commutates OFF before being triggered into conduction.

To initiate motor rotation during the start-up mode of operation, the start winding is energized by triggering start winding triac 30 into conduction. The direction of rotation of the motor is determined by triggering triac 30 into conduction at one predetermined firing angle to initiate motor rotation in one direction and another predetermined firing angle to initiate motor rotation in the other direction. As with the run winding, these time periods are measured from the occurrence of a zero crossing pulse generated by a voltage sensing means 39. Satisfactory operating performance has been achieved for rotation in the high torque direction using a firing angle in the range of 25°-45°. Though it need not be, this firing angle may be the same as that chosen for the run winding triac. In the illustrative embodiment, the firing angle for both run and start is chosen to be 40°. The start winding voltage and current waveforms for operation in the high torque direction with a 40° firing angle is shown in FIG. 2.

For rotation in the opposite or low torque direction, the phase angle or firing angle for the start winding triac in the range of 90°-135° has been found to provide satisfactory results. In the illustrative embodiment, the phase or firing angle for rotation in the low torque direction has been chosen to be 120°. The start winding voltage and current for operation in the low torque direction is illustrated in FIG. 3.

Figure 6:
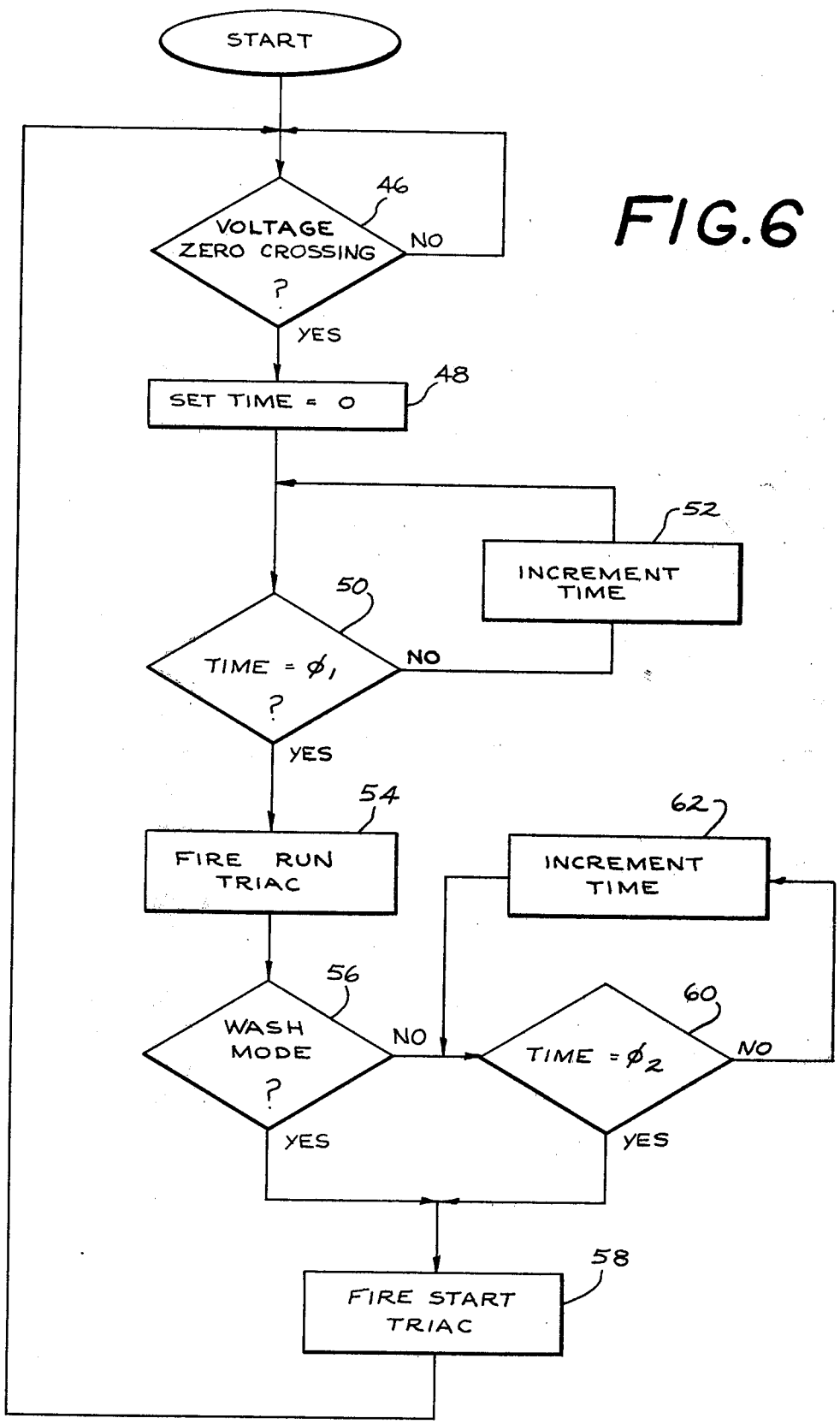
FIG. 6 is a flow chart for the microcontroller in the circuit of FIG. 5 for implementing the phase control scheme of one form of the invention.

Microcontroller 40 can be programmed to perform motor direction control in accordance with the present invention in accordance with the simplified flow chart of FIG. 6. It will be appreciated that instructions implementing the flow chart of FIG. 6 may be interleaved with other instructions in the microcontroller which is typically programmed to systematically control the various components of the appliance, including motor direction selection so as to provide the desired cyclical operation of the appliance.

Following a command to start up the motor, the program iterates the loop between instruction blocks 46 and 58 once each half-cycle of the line voltage signal, each pass being initiated by a zero crossing of the voltage signal. Thus, at start up the program waits for the next zero crossing of the power line voltage signified by a signal from voltage sensing means 39 (Inquiry 46). Upon receipt of this signal the TIME register is initialized to zero (Block 48). The TIME register is used to measure elapsed time from the zero crossing of the voltage signal. The program then proceeds to Inquiry 50 which, in cooperation with Block 52 which increments the TIME register, causes the program to pause until the elapsed time, represented by TIME equals 1.85 milliseconds corresponding to the first firing angle $\phi_1$, the firing angle for the run triac. The elapsed time of 1.85 milliseconds corresponds to a firing angle of 40°. When the elapsed time signified by TIME equals $\phi_1$, run triac 32 is triggered (Block 54) and the program proceeds to Inquiry 56 which asks whether the motor 10 is to operate in the wash mode or the spin mode. In this embodiment, the selection means is a flag, the state of which is determined by a portion of the microcontroller which is preprogrammed to control cyclical operation of the appliance. Inquiry 56 checks the state of this flag to determine which mode of operation has been selected for implementation at this point in the appliance operating cycle. The details of such other routines which may be utilized to control the cyclical operation are not part of the present invention. Numerous ways of implementing such controls are known in the art. Such details are omitted here in the interest of simplicity and clarity. If the motor is to operate in the wash mode corresponding to the high torque direction, the start triac 30 is triggered into conduction (Block 58) and the program returns to Block 46 to await the next voltage zero crossing. The routine is then repetitively performed for each succeeding voltage signal half-cycle. If the spin mode is desired corresponding to operation in the low torque direction, Inquiry 56 directs the program to Inquiry 60 which in cooperation with TIME incrementing Block 102 delays the program until the firing angle $\phi_2$, the angle for triggering the start triac to initiate motor rotation in the low torque direction for spin, occurs. For the illustrative embodiment, $\phi_2$ is selected to be 5.5 milliseconds corresponding to approximately 120 degrees. When TIME equals $\phi_2$, the start triac 30 is triggered into conduction (Block 58) and the program returns to Block 46 to await the next voltage zero crossing.

What has been described thus far is a control arrangement for selectively initiating rotation of a split phase induction motor in the desired direction by phase controlling the start winding current during the start-up phase of motor operation. The motor control arrangement as described thus far could be readily implemented employing conventional switch means for opening the start winding circuit when the motor comes up to speed such as, for example, connecting a centrifugal switch in series with start winding 12 in the circuit of FIG. 5.

However, in accordance with another form of the present invention, means are provided for deenergizing the start winding when the motor is up to speed using the same electronic switching components used in starting the motor, thereby eliminating the need for the additional switch means of the prior art. The means for deenergizing the start winding include means for monitoring the motor speed operation to detect when the motor speed exceeds a predetermined threshold. The control means is responsive to the monitor means and operative to inhibit trigger signals to the start winding triac upon detection of motor speed in excess of the threshold speed thereby preventing further energization of the start winding once the motor has come up to speed.

In a preferred form of the invention incorporating means to deenergize the start winding, motor speed is monitored by monitoring the phase angle between the run current and the supply voltage. Means are provided for detecting or sensing the phase angle between the run current and the supply voltage operative to compare the measured phase angle with a reference. When a predetermined relationship exists between phase angle and reference, signifying that the motor speed is in excess of the threshold speed, the control means thereafter inhibits the trigger signals for the start current triac thereby effectively deenergizing the start winding.

In the illustrative embodiment, the means for monitoring the phase angle is provided in the form of a second voltage sensing means 64 connected in parallel with snubber circuit 35 operative to detect zero crossings of the voltage generated across triac 32. The zero crossing of the voltage across triac 32 corresponds to zero crossings of the current through triac 32. Thus, the output of voltage sensing means 64 effectively marks the zero crossings of the current through triac 32. This zero crossing signal is provided to an input port of control means 40 which is programmed to compute the time delay between this signal and the voltage zero crossing signal from voltage sensing means 39 to compute the phase angle between the line voltage and the run winding current. The circuitry and manner of operation of the phase angle monitoring means is described in detail in copending U.S. patent application Ser. No. 299,372, by Robert K. Hollenbeck, filed Sept. 4, 1981, the disclosure of which is hereby incorporated by reference.

We have empirically determined that when initiating rotation of the motor in the high torque direction, the relationship between motor speed and the phase angle for the run winding is such that the phase angle decreases as the speed increases toward normal running speed. We have further determined that if the motor fails to get up to speed within roughly half a second, a greater decrease in phase angle must thereafter be relied upon to signify the reaching of satisfactory running speed.

Consequently, in the illustrative embodiment two references are employed, one for the initial half second and a second for the period after the initial half second. The phase angle measured at the end of the third cycle of the line voltage is used to establish reference values. A delay of three cycles to obtain the reference phase angle is to avoid transient fluctuations. The first reference value is established by subtracting 0.65 milliseconds from the phase angle measured at the end of the third cycle of the voltage signal and storing this value in memory as a first reference, to be used until the end of the 30th cycle corresponding to an elapsed time of half a second. At this point in time if the motor is not yet up to speed, an additional 0.35 millisecond is subtracted from the first reference and stored in memory as the reference value for the balance of the motor start up period. Thus, in effect, during the first half second of the start-up period, a reduction in phase angle for the run winding of 0.65 milliseconds signifies that the motor has attained satisfactory running speed. After the first half second of operation, a reduction in phase angle of 1.0 milliseconds is employed to signify that the motor has come up to speed.

We have similarly empirically determined that when initiating motor rotation in the low torque direction (start winding firing angle greater than 90°) the phase angle for the run winding increases with increasing motor speed as the motor approaches running speed. Consequently, when operating in this mode an increase in phase angle is relied upon to signify that the motor speed exceeds a predetermined threshold speed. Again, the phase angle measured at the end of the third voltage signal cycle of the start-up period is used to establish the reference. For this mode of operation, however, the phase angle is increased by 0.25 milliseconds. This value is then stored in memory as the reference value. The control system then repetitively measures the phase angle and compares the present measurement with the reference. When the present measurement is greater than the reference representing an increase in phase angle of 0.25 milliseconds, trigger signals to the start triac 30 are inhibited for the balance of the motor operating period.

Figure 7:
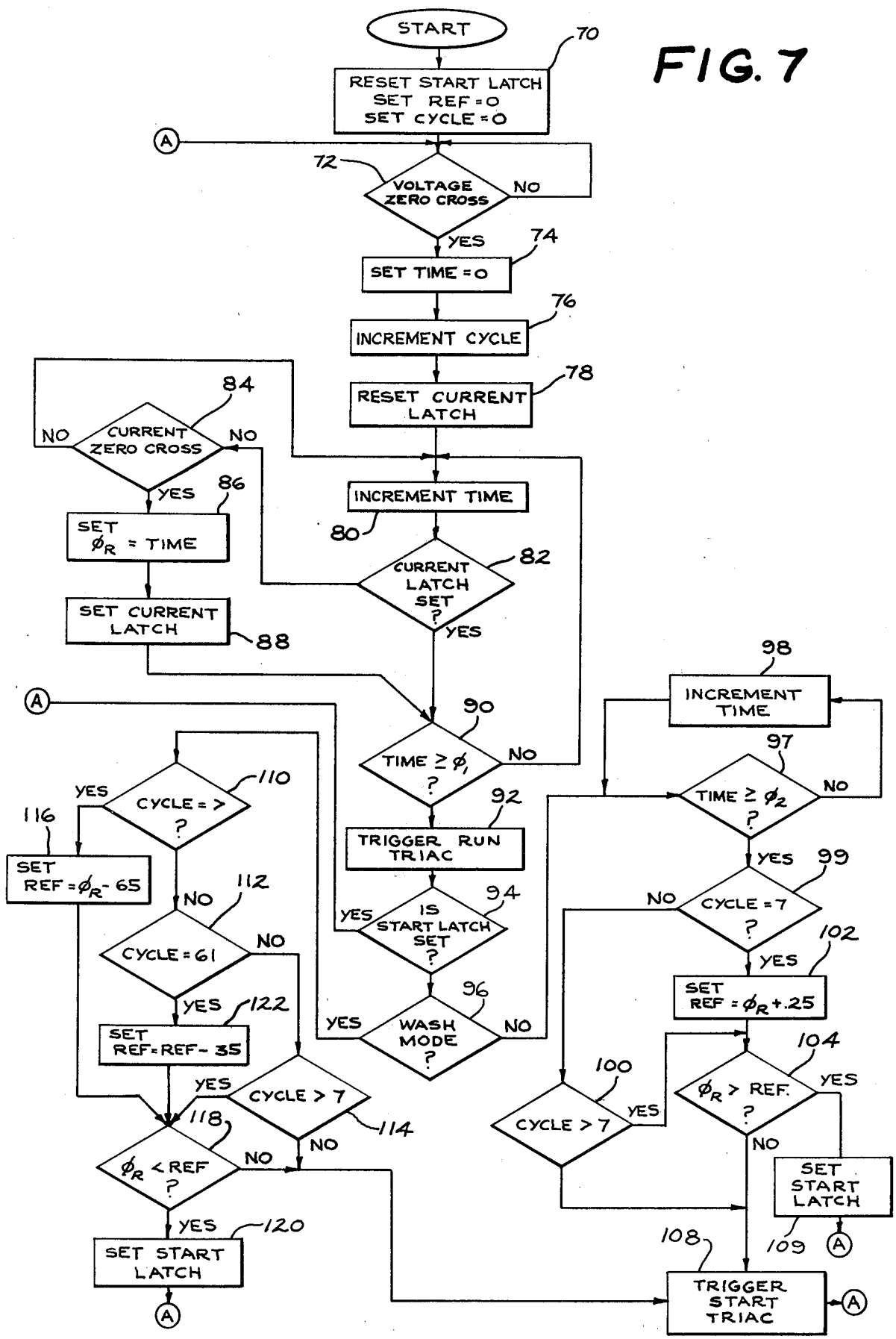
FIG. 7 is a flow chart for the microcontroller in the circuit of FIG. 5 for implementing the phase control scheme of another form of the invention.

To implement this form of the invention in the circuit of FIG. 5, microcontroller 40 is preprogrammed to control the operation of motor 10 in accordance with the flow chart of FIG. 7. Again, it will be appreciated that the instructions implementing the flow chart of FIG. 8 may be interleaved with other instructions in the microcontroller which is typically programmed for controlling the overall operating system of the appliance of which motor control is only one part of the operating program. Also the program of FIG. 7 will be executed once during each half cycle of the power signal initiated by zero crossings of the voltage signal.

Referring now to the flow chart of FIG. 7, when a command is given to start motor 10, an internal latch or flag designated START LATCH is reset and registers designated REF and CYCLE are initialized to zero (Block 70). Decision Block 72 then waits for the next zero crossing of the line voltage signal signified by a signal from voltage sensing means 39. Upon receipt of this signal, the TIME register which represents elapsed time from the voltage zero crossing is initialized to zero (Block 74).

Next, the CYCLE register which counts the voltage zero crossings is incremented (Block 76). This information is used to determine when the 3 voltage signal cycles (CYCLE=7) and 30 voltage cycles (CYCLE=61) have elapsed to facilitate establishment of the phase angle reference values. Next, the CURRENT LATCH described hereinafter is reset (Block 78). The TIME register is incremented (Block 80) and Inquiry 82 asks if a zero crossing of the line current has been detected during a previous pass through the program, as signified by the set state of the internal flag or latch designated the CURRENT LATCH. If yes, the phase angle will have already been measured for the present half-cycle and the phase angle measurement loop is bypassed for the balance of the half cycle. If no, the program loops between Inquiry 82, 84 and Block 80 until a current zero crossing signal from sensing means 64 is detected. Upon detection of this signal, the phase angle variable $\phi_R$ is set equal to the TIME register (Block 86) which indicates the time elapsed since the last voltage zero crossing and the CURRENT LATCH is set (Block 88). Thereafter, for the balance of the half-cycle, Inquiry 90 causes the program to loop between Blocks 80, 82 and 90 until the elapsed time represented by TIME, equals or exceeds $\phi_1$ signifying the occurrence of the first predetermined firing angle, the firing angle for the run winding. In the illustrative embodiment, $\phi_1$ is chosen to be 1.85 milliseconds corresponding to a phase angle of 40° degrees. When TIME equals $\phi_1$, Inquiry 90 is Yes, and a trigger signal is supplied to run triac 3 2(Block 92).

Inquiry 94 asks if the START LATCH is set, signifying that the start triac trigger signals are to be inhibited. The START LATCH is an internal flag or latch used to signify, when set, that the phase angle condition signifying that the motor is up to speed has been satisfied and thereafter start triac triggering should be inhibited. If Yes, the program returns to Block 72 to await the next voltage zero crossing. If No, Inquiry 96 asks which operating mode or motor direction is commanded. If the spin mode or low torque direction is commanded, signified by a No to Inquiry 96, the loop comprising Inquiry 97 and Block 98 delays the program until TIME signifies the occurrence of the second firing angle $\phi_2$ corresponding to desired firing angle for low torque operation, signified by a Yes to Inquiry 98. In the illustrative embodiment, $\phi_2$ is equal to 5.5 milliseconds corresponding to a phase angle of 120°.

Blocks 99–106 perform the comparison of the phase angle to the reference to determine if the trigger signal should be inhibited. During the first 3 full cycles of the voltage signal, CYCLE which is incremented once for each zero crossing is less than 7. Thus, Blocks 99 and 100 cooperate to bypass the phase angle comparing instructions and direct the program to Block 108 which triggers start triac 30 and returns the program to Block 72. During the first half cycle after the third cycle, CYCLE equals 7, and Block 99 directs the program to Block 102 where the reference REF is set equal to the measured phase angle for the present half-cycle $\phi_R$ plus 0.25 milliseconds. For subsequent half cycles, CYCLE is greater than 7 and Inquiry 99 and 100 direct the program to Inquiry 104 which compares the present phase angle measurement $\phi_R$ to the stored reference value REF. When $\phi_R$ is less than REF, the start triac is triggered (Block 108) and the program returns to Block 72 to await the next zero crossing of the voltage signal. When the measured phase angle is found to exceed REF, signifying the motor is up to speed, the START LATCH is set (Block 109) and the program returns to Block 72 to await the next zero crossing. Thereafter, the program loops between Blocks 72 and 94 bypassing Block 108, thereby effectively inhibiting the trigger signals to the start triac.

For operation in the wash mode, signified by a Yes to Inquiry 96, the portion of the program represented by Blocks 110–120 perform the phase angle comparison. During the first three cycles, signified by CYCLE less than 7, Inquiries 110, 112 and 114 bypass the balance of the phase angle comparison instructions and trigger start triac 30 (Block 108).

During the first half cycle after the third cycle when CYCLE equals 7, the reference REF is set equal to the measured phase angle $\phi_R$ less 0.65 milliseconds (Block 116). Inquiry 118 then asks if the measured phase angle $\phi_R$ is less than REF, to which during this pass the answer must be No, and the start triac is triggered (Block 108). In the interim, after the third cycle and before the 31st cycle of the voltage signal, REF remains unchanged. If, during this interval, $\phi_R$ is less than REF signified by a Yes to Inquiry 118, the START LATCH is set (Block 120) and the program returns to Block 72 and thereafter loops between Blocks 72 and 94, again effectively inhibiting the start triac trigger signals by bypassing Block 108.

If at the end of 30 cycles, signified by CYCLE equal to 61, the motor has not come up to speed, it is necessary to adjust the reference value REF. Thus, when Inquiry 112 detects CYCLE equal to 61, the reference REF is reduced by 0.35 milliseconds (Block 122). This adjusted reference value is used thereafter by Inquiry 118 when comparing the measured phase angle $\phi_R$ to the REF. After 30 cycles (500 milliseconds), CYCLE is greater than 61. Consequently, thereafter, Inquiries 110, 112 and 114 direct the program to Inquiry 118 which compares the measured phase angle for the present half-cycle with the adjusted value of REF. Start triac 30 will be triggered in conduction (Block 108) until the phase angle $\phi_R$ is less than the REF, at which time the START LATCH is set (Block 120) and the program thereafter loops between Blocks 72 and 94 to trigger the run triac while effectively inhibiting the start triac by bypassing Block 108.

It will be understood by those skilled in the art that while the arrangement of the present invention for de-energizing the start winding when the motor gets up to speed is advantageously employed in combination with the phase control start up arrangement, it can also be employed in combination with conventional motor direction control arrangements. For motors employing polarity reversal of the start winding for direction control, only the phase angle comparison associated with the high torque direction need be used. In addition it will be understood that the reference values used for phase angle comparisons may vary for different motor designs and should be empirically determined for the specific motor being used.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A start control arrangement for a reversible alternating current split phase induction motor having a run winding electrically connected in parallel with a start winding adapted for energization by a voltage signal from an external alternating current power supply, said start control arrangement being effective to selectively initiate motor rotation in one direction or the other, said start control arrangement comprising:
   selection means for selecting rotation of the motor in one direction or the other;
   current control means for connection in series with the start winding of the motor having a conductive state and a non-conductive state and operative when conductive to pass current from the power supply to the start winding and when non-conductive to prevent current from flowing in the start winding; and
   control means comprising:
      voltage sensing means for detecting zero crossings of the voltage signal from the external supply;
      timing means operative to sense the elapsed time from the preceding zero crossing; and
      start control means responsive to said timing means and said selection means operative to render said current control means conductive for a first predetermined portion of each half-cycle of the voltage signal when rotation in said one direction is selected, thereby initiating motor rotation in said one direction and to render said current control means conductive for a second predetermined portion of each half-cycle when rotation in said other direction is selected, thereby initiating motor rotation in said other direction.

2. The control arrangement of claim 1 wherein said first predetermined portion is in the range of 80-100% of the voltage half-cycle and said second predetermined portion is in the range of 30-55% of the voltage half-cycle.

3. The control arrangement of claim 1 or 2 wherein said current control means comprises thyristor means and said motor starting means triggers said thyristor means into conduction at a first predetermined time following the preceding zero crossing of the voltage signal to initiate motor rotation in said one direction and at a second predetermined time following the preceding zero crossing of the voltage signal to initiate motor rotation in the other direction.

4. The control arrangement of claim 3 wherein said first predetermined time corresponds to a firing angle less than and said second predetermined time corresponds to a firing angle greater than 90°.

5. The control arrangement of claim 3 wherein said second predetermined time corresponds to a firing angle in the range of 90°-135°.

6. The control arrangement of claim 3 wherein said first predetermined time corresponds to a firing angle of approximately 40° and said second predetermined time corresponds to a firing angle of approximately 120°.

7. A direction control arrangement for a reversible alternating current induction motor adapted for energization by a voltage signal from an external power supply, said control arrangement comprising:
   a reversible alternating current split phase induction motor including a run winding and a start winding, said run winding being electrically connected in parallel with said start winding;
   selection means for selecting motor rotation in one direction or the other;
   phase control means electrically connected in series with said start winding operative to control the duration of the conductive portion of each half-cycle of the current in said start winding;
   control means responsive to said selection means for rendering said phase control means conductive at a first predetermined phase angle when said one direction of rotation is selected thereby initiating rotation of said motor in said one direction and rendering said phase control means conductive at a second predetermined phase angle when said other direction is selected thereby initiating rotation of said motor in said opposite direction.

8. The control arrangement of claim 7 wherein said phase control means comprises a triac device and wherein said control means comprises voltage detection means for generating a zero crossing pulse marking each zero crossing of the supply voltage signal and electronic control means responsive to said detection means and pre-programmed to generate a triac trigger signal during each half-cycle of the voltage signal at a first predetermined time corresponding to said first phase angle and at a second predetermined time corresponding to said second phase angle; said first and second times being measured from the occurrence of each zero crossing pulse.

9. The control arrangement of claim 8 wherein said first phase angle is less than 45° and said second firing angle is greater than 90°.

10. The control arrangement of claim 8 wherein said second phase angle is in the range of 90°-135°.

11. The control arrangement of claim 8 said first phase angle is approximately 40° and said second phase angle is approximately 120°.

12. A start control arrangement for a reversible alternating current induction motor, said control arrangement comprising:
   a reversible alternating current split phase induction motor adapted for energization by a voltage signal from an external power supply, said motor including a run winding and a start winding, said run and start windings being electrically connected in parallel;
   first thyristor means electrically connected in series with said run winding;
   second thyristor means electrically connected in series with said start winding;
   control means operative to trigger said first thyristor means into conduction at a predetermined run winding firing angle and to selectively trigger said second thyristor means into conduction at a first predetermined start winding firing angle to initiate motor rotation in one direction and at a second predetermined start winding firing angle to initiate motor rotation in the other direction;

means for monitoring motor speed and operative to detect when said motor speed exceeds a predetermined running speed threshold;

said control means being responsive to said monitor means and further operative to inhibit trigger signals to said second thyristor means upon detection of motor speed in excess of said threshold speed, thereby preventing further energization of said start winding once said motor has come up to speed.

13. The control arrangement of claim 12 wherein said means for monitoring motor speed comprises means for measuring the phase angle between said run current signal and the supply voltage signal operative to detect when a predetermined relationship exists between the phase angle and a reference signifying a motor speed in excess of the threshold motor speed, and wherein said control means inhibits said trigger signals for said second thyristor means when said predetermined relationship is detected.

14. The control arrangement of claim 12 wherein said means for monitoring motor speed comprises means for repetitively measuring the phase angle between the run current signal and the supply voltage signal, means for detecting the existence of a first predetermined relationship between the present phase angle measurement and a reference value when said motor rotation is being initiated in said one direction, signifying motor speed in excess of the threshold speed, and detecting the existence of a second predetermined relationship between the present phase angle measurement and the reference value when motor rotation is being initiated in said other direction, signifying motor speed in excess of the threshold speed, and wherein said control means inhibits said trigger signals for said second thyristor means when either said first or said second relationship is detected.

15. A control arrangement for automatically deenergizing the start winding of a split phase induction motor when the running speed of the motor exceeds a predetermined threshold speed, said control arrangement comprising:

a split phase induction motor adapted for energization by an external voltage supply and including a run winding and a start winding, said run winding being electrically connected in parallel with said start winding;

thyristor means electrically connected in series with said start winding to control energization of said start winding; and control means comprising:
means for selectively triggering said thyristor means into conduction;
means for repetitively measuring the phase angle between the run current and the line voltage signals;
memory means for storing one of the phase angle measurements in said memory means as a reference; means for comparing subsequent phase angle measurements to said reference and detecting a change of predetermined magnitude between the present phase angle measurement and the reference value the change being representative of motor running speed exceeding the threshold speed; and
means for inhibiting trigger signals to said thyristor means following detection of said change, whereby the start winding is effectively deenergized when the motor reaches running speed.

16. The control arrangement of claim 15 wherein said predetermined change in phase angle comprises a decrease of predetermined magnitude between the present phase angle measurement and the reference.

17. A control arrangement for automatically deenergizing the start winding of a split phase induction motor when the running speed of the motor exceeds a predetermined threshold speed, said control arrangement comprising:

a split phase induction motor adapted for energization by an external voltage supply and including a run winding and a start winding, said run winding being electrically connected in parallel with said start winding;

thyristor means electrically connected in series with said start winding to control energization of said start winding; and control means comprising:
means for selectively triggering said thyristor means into conduction;
means for repetitively measuring the phase angle between the supply voltage signal and the run winding current signal;
memory means for storing a phase angle measurement measured at a first predetermined time as a reference value;
means for detecting a first change of a first predetermined magnitude between the present phase angle measurement and the reference value during the time period between said first predetermined time and a second predetermined time and to detect a second change of a second predetermined magnitude between the present phase angle measurement and the reference value thereafter; said first and second changes signifying motor speed in excess of a threshold speed; and
means responsive to said detecting means operative to inhibit said trigger means for triggering said thyristor means into conduction following detection of said first or second change, thereby preventing energization of said start winding when said motor has achieved running speed.

18. The control arrangement of claim 17 wherein said first change comprises a decrease in phase angle of a first predetermined magnitude and said second change comprises a decrease of a second predetermined magnitude greater than said first decrease.

* * * * *